US008009025B2

(12) United States Patent
Engström et al.

(10) Patent No.: US 8,009,025 B2
(45) Date of Patent: Aug. 30, 2011

(54) METHOD AND SYSTEM FOR INTERACTION BETWEEN A VEHICLE DRIVER AND A PLURALITY OF APPLICATIONS

(75) Inventors: Johan Engström, Göteborg (SE); Petter Larsson, Ytterby (SE)

(73) Assignee: Volvo Technology Corp, Göteborg (SE)

( * ) Notice: Subject to any disclaimer, the term of this patent is extended or adjusted under 35 U.S.C. 154(b) by 584 days.

(21) Appl. No.: 11/419,511

(22) Filed: May 22, 2006

(65) Prior Publication Data
US 2006/0287787 A1    Dec. 21, 2006

Related U.S. Application Data

(63) Continuation of application No. PCT/EP2004/013229, filed on Nov. 22, 2004.

(30) Foreign Application Priority Data

Nov. 20, 2003  (SE) .................................. 0303122
Nov. 25, 2003  (WO) ..................... PCT/SE03/01833

(51) Int. Cl.
*B60Q 1/00* (2006.01)
(52) U.S. Cl. ........................ 340/438; 701/1; 455/238.1
(58) Field of Classification Search .................. 340/438, 340/439, 500; 701/36, 1; 455/238.1
See application file for complete search history.

(56) References Cited

U.S. PATENT DOCUMENTS

| 5,448,242 | A | * | 9/1995 | Sharpe et al. | 342/42 |
| 5,760,709 | A | * | 6/1998 | Hayashi | 340/923 |
| 6,957,128 | B1 | * | 10/2005 | Ito et al. | 701/1 |
| 2002/0070852 | A1 | | 6/2002 | Trauner et al. | |
| 2005/0143884 | A1 | * | 6/2005 | Bihler et al. | 701/36 |
| 2005/0231529 | A1 | * | 10/2005 | Skwarek et al. | 345/619 |

FOREIGN PATENT DOCUMENTS

| DE | 10144752 A1 | 3/2003 |
| DE | 10153987 A1 | 5/2003 |
| DE | 10162653 A1 | 7/2003 |
| WO | 03036805 A1 | 5/2003 |

OTHER PUBLICATIONS

Translation of Official Action from corresponding Japanese Application.
International Search Report from corresponding International Application PCT/EP2004/013229.
Malec, J., et al., "Driver Support in Intelligent Autonomous Cruise Control" Proceedings of the Intelligent Vehicles '94 Symposium (Cat. No. 94TH8011) IEEE New York, NY USA (Oct. 24, 1994) pp. 160-164, XP010258314 ISBN:0-7803-2135-9.

(Continued)

*Primary Examiner* — George Bugg
*Assistant Examiner* — Edny Labbees
(74) *Attorney, Agent, or Firm* — WRB-IP LLP

(57) ABSTRACT

A method and system for at least one of communication and interaction between a vehicle driver and a plurality of at least one of integrated and non-integrated applications like, e.g., native vehicle applications and/or aftermarket applications and/or nomad applications is disclosed. Especially, such a method and system for managing the at least one of communication and interaction by means of an interaction manager is provided, by which this at least one of communication and interaction is conducted or managed in such a way that risks and impairments for the safety and comfort of the driver are reduced considerably and workload and distraction of the driver are reduced considerably as well.

67 Claims, 5 Drawing Sheets

OTHER PUBLICATIONS

Knoll, P.M., et al. "Advanced Integrated Driver Information Systems", Measurement and Control, Institute of Measurement and Control, London, GB vol. 25, No. 9 (Nov. 1, 1992), pp. 264-268, XP 000320446, ISSN: 0020-2940.

"Standard SAE J2395: ITS In-Vehicle Message Priority" Feb. 2002, SAE (Society of Automotive Engineers), Warrendale, PA USA XP008044585, paragraphs '03.4!, '04.3!.

Extended European Search Report for corresponding European App. EP 10 01 4500.

AMI-C: "AMI-C vehicle interface requirements", vvww.archive.org 1-3, 7 -9, I N. V . 11,13. G06F3/14 14.10, G01C21/36 18,19,21 G07C5/08 B60R16/02, Feb. 28, 2003, pp. 1-73, XP002631780, Retrieved from the Internet: URL:http://replay.waybackmachine.org/20030 430144533/http://www. ami-c. org/ R2Specs/2003v1%2700.ZIP [retrieved on Apr. 6, 2011] * p. 11 * * p. 54 - p. 55 * * p. 64 - p. 70 *.

* cited by examiner

METHOD AND SYSTEM FOR INTERACTION BETWEEN A VEHICLE DRIVER AND A PLURALITY OF APPLICATIONS

The present application is a continuation of International Application PCT/EP2004/013229, filed Nov. 22, 2004, which claims priority to SE 0303122-6, filed Nov. 20, 2003, and PCT/SE03/001833, filed Nov. 25, 2003, all of which are incorporated by reference.

BACKGROUND AND SUMMARY

The invention relates to a method and system for communication interaction between a human being, especially a vehicle driver, and a plurality of integrated non-integrated applications like e.g. native vehicle applications and/or aftermarket applications and/or nomad applications. Especially, the invention relates to such a method and system for managing the communication interaction by means of an interaction manager.

Today, there is a strong trend towards the integration of vehicle built-in applications and functions in such a way that they can share at least partly the same hardware and/or software components like e.g. sensors and displays. Such applications especially include Advanced Driver Assistance Systems (ADAS) and In-Vehicle Information Systems However, aftermarket add-on applications which are added after shipping of the vehicle, are still very common. Moreover, many drivers use portable computing devices like PDAs (Personal Digital Assistants), mobile phones and other stand-alone applications (nomad systems) in the vehicle as well. All these applications and other technologies have great potential for enhancing road safety, as well as enhancing the quality of life and work.

However, the proliferation of such in-vehicle applications increases the risk for conflicts, e.g. when applications are activated and messages (e.g. incoming diagnostic messages or SMS [Short Message Service] messages) are presented simultaneously. This may reduce comfort and impose safety-critical levels of workload and distraction on the driver. Moreover, interference between different ADAS and IVIS may lead to sub-optimal performance, reduced user acceptance and, hence, reduced safety benefits of these applications.

In "Generic Intelligent Driver Support", edited by John A. Michon, 1993 (Taylor & Francis, London, Washington), the GIDS (Generic Intelligent Driver Support) project is disclosed which had two main focuses: (1) to develop generic driver support functions and (2) to develop techniques for integrating these functions and making them adaptive to the driver and the driving environment. A key feature of the GIDS project was information management. The core of such functions developed in GIDS was:

1. Prioritization which prevents conflicting information from different support and service functions to be presented simultaneously, by presenting information sequentially and according to priority; and
2. Scheduling which prevents conflicts between system-initiated information and demands imposed by the driving task by re-scheduling (e.g. postponing) information of low or medium priority initiated during demanding driving situations.

These functions have been realised by a data flow protocol according to which each application presenting information to the driver sent a "request" to a unit called the "dialogue controller", wherein the request contained among other features the following attributes:

Application identification (ID), message priority (on a 6-point scale), preferred time of presentation, content of message and specifications for the integrated HMI (Human Machine Interface), order within task cluster and imposed workload per resource (i.e. how much workload the message will impose on the driver in each of the sensory modalities).

Based on an estimation of the current workload, provided by a workload estimator, the dialogue controller decides when and how the message is presented to the driver. The dialogue controller is also responsible for actually presenting the information to the driver through an integrated HMI. Thus, the basic GIDS information management function is to filter information presented through the common HMI of the dialogue controller. However, no method is disclosed for enabling the integrated management of stand-alone systems which have their own HMIs (e.g. aftermarket and nomad systems).

U.S. patent application US 2002/0120374A1 discloses a system and method for driver performance improvement by which operator activity data relating to activities of the operator within an interior portion of the vehicle are monitored and vehicle operating data, vehicle environment data and operator condition data are received. An operator cognitive load is estimated and on the basis of these data vehicle information is prioritized for selectively informing the operator of vehicle information.

Furthermore, the system may also operate with wireless communication devices like mobile phones, PDAs and pagers and prioritize incoming calls, e-mails and text and data messages of such devices, respectively.

However, integrating these so called stand-alone devices into this system. requires additional hardware, especially a sensor fusion module and appropriate processing capability at or within the related device. This is considered to be disadvantageous and expensive.

It is desirable to provide a method and system for communication and/or interaction between a vehicle driver and a plurality of integrated non-integrated applications as mentioned above by which this communication and/or interaction is conducted or managed in such a way that risks and impairments for the safety and comfort of the driver are reduced considerably and workload and distraction of the driver by such communication and/or interaction is reduced considerably as well.

It is desirable to provide such a method and system by which aftermarket and non-integrated applications like stand-alone or mobile applications and nomad applications can be integrated and used, respectively, as a part of the whole information management architecture of the system.

It is desirable to provide such a method and system by which non-integrated applications and nomad applications which have their own human machine interface can be integrated and used, respectively, as a part of the whole information management architecture of the system as well.

It is desirable to provide such a method and system which offer an open system architecture especially for integrating aftermarket and nomad applications according to the need of the driver and in such a way that workload and distraction of the driver by these applications are reduced considerably.

In the present application, the term "application" shall cover any systems, components, functions, devices, units and modules which are able after their activation to communicate and/or interact one-and/or bidirectional with the vehicle driver, for example by initiating, sending and/or receiving actions to/from the driver, sending and/or receiving messages to/from the driver etc. Such an application can also be very sophisticated like e.g. a collision avoidance system.

Further, a driver/vehicle environment (DVE) state is a state which is evaluated on the basis of output signals of one or a plurality of sensors for detecting parameters of the driver and/or the vehicle and/or the environment.

The inventive methods and systems are able to handle integrated or "native" applications which are implemented in the vehicle before shipping, as well as non-integrated applications like aftermarket applications that are added later and those applications which are brought into the vehicle temporarily or permanently by the driver or a passenger (nomad applications).

The centralized management of the communication interaction between a driver and the applications by means of an interaction manager opens a great potential for a high degree of modularity, comparatively simple system architecture and the possibility to extend the system in a simple way by additional applications which are able to send requests and receive responses according to an aspect of the present invention.

This is also due to the fact that the communication interaction itself is not changed or altered by the interaction manager (only allowed or not allowed) but is conducted solely by the related application. So the interaction manager does not need to know for which kind of communication and/or interaction each application is provided for, and further does not need to know the kind of application that sent the request.

Especially if requests and responses have a standardized format, the inventive methods and systems offer an open system architecture and the use of standardized data protocols so that they can be extended in a very flexible way with applications which are built-in later (or to nomad applications), without the need to change the interaction manager itself.

As an alternative or as a complement to the solution according to aspects of the present invention, the interaction manager can control the capability of the applications to communicate and/or interact with a vehicle driver in dependence of a DVE state and in the absence of any request from the related application.

Finally, the inventive methods, systems and applications are not limited to the communication and/or interaction with a vehicle driver but with any human being who is confronted more or less simultaneously with a plurality of signal or information sources which in case of activation have to be considered or handled in dependency of at least one certain environment state and/or other such activated signals and/or information sources and/or other conditions.

BRIEF DESCRIPTION OF THE DRAWINGS

Further details, features and advantages of the invention are evident from the following description of exemplary embodiments of the invention in connection with the drawings, in which schematically shows.

DETAILED DESCRIPTION

Figure 1:
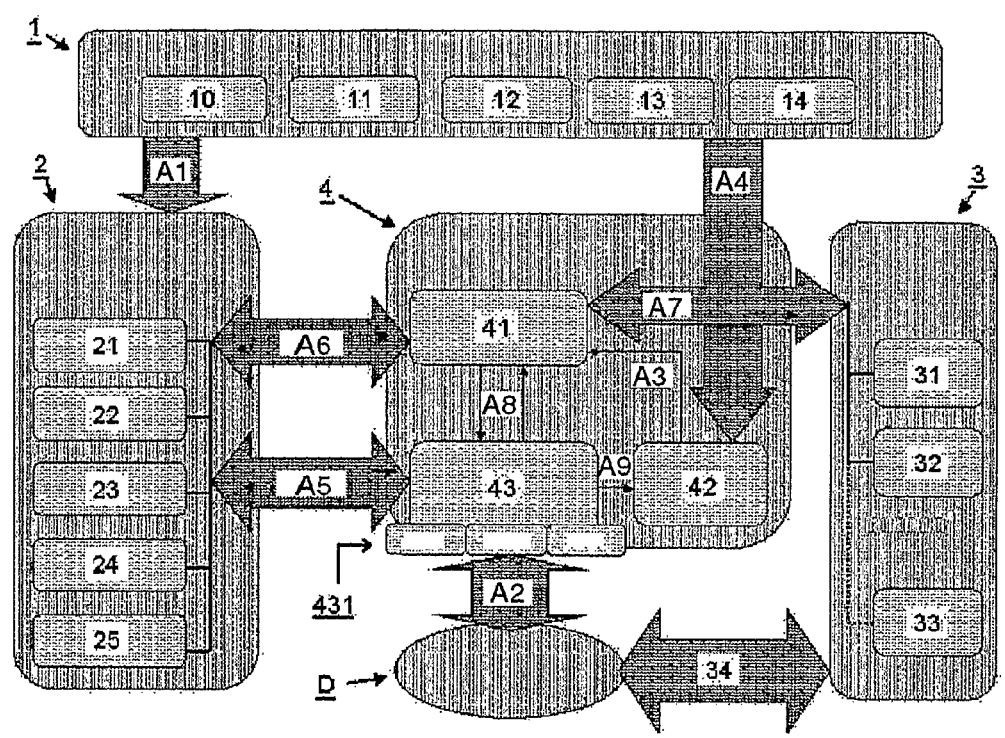
FIG. 1 a first functional architecture of such an exemplary and preferred embodiment of a system according to the invention.

The inventive system according to FIG. 1 can be implemented e.g. on a multiplex vehicle bus like the well-known CAN-bus or MOST-bus or a wireless LAN (Local Area Network), working with the Bluetooth-or any other standard, and comprises the following four main components:

The first main component is a sensor array 1 which generally comprises one, but preferably a plurality of sensors of all possible types that are provided to monitor and/or to detect the state of the driver and/or the state of the vehicle and/or the state of the environment.

The sensor array 1 according to FIG. 1 comprises exemplarily a first group 10 of driver state sensors which for example are head movement sensors and/or gaze sensors and/or eyelid closure sensors for tracking the movement of the head and/or the eye and/or the eyelid of a driver. (The gaze direction is the direction in which a person momentarily directs the attention [fovea] of his eyes with the eye-balls as reference).

A second group 11 of vehicle state sensors comprises for example speed sensors, accelerometers, steering wheel angle sensors, pedal position sensors, gyros, tire pressure sensors or other sensors for detecting various vehicle related information.

A third group 12 of environment state sensors comprises e.g. radar and/or laser sensors and/or video cameras and is provided for detecting and/or monitoring e.g. the surrounding traffic.

A fourth group 13 of sensors (e.g. GPS sensors with map matching) is provided for detecting the geographical position of the vehicle, and a fifth group 14 of sensors (e.g. lane tracking sensors) monitors the position of the vehicle on the road and/or other environmental states.

The second main component is formed by a plurality of units, modules or applications 2 which are integrated into the vehicle. Preferably, these applications share the sensor array 1 (arrow A1) and/or those input/output devices 431 (like e.g. displays, audio systems, buttons, knobs etc.) which belong to a common integrated human machine interface 43 (HMI) which is explained below.

These integrated units, modules or applications 2 comprise as well the core computation units of an Advanced Driver Assistance System (ADAS) and/or an In-Vehicle Information System (IVIS) that are integrated into the vehicle architecture. According to Figure these integrated applications 2 are for example an attention support system 21, a route guidance system 22, a lane departure warning system 23, a tyre pressure monitor system 24 and information-and entertainment systems 25 like e.g. radio, CD, DVD and other.

Thus, based on the output signals of the sensor array the integrated applications 2 perform the computations needed for determining what action to take (e.g. issue a warning). They then use the common integrated HMI 43 (arrow A5) for interacting with the driver D (arrow A2).

The third main component is a plurality of units, modules or applications 3 which might be integrated into the vehicle architecture but not into the integrated HMI 43. These are considered as stand-alone applications 3. Generally, these applications 3 have their own sensors and/or input/output devices, like displays, keyboards other non-integrated HMIs 34 for communicating and/or interacting with the driver D.

The units, modules or applications 3 comprise according to FIG. e.g. integrated applications 31 which, however, utilize their own HMI (which is not integrated into the integrated HMI 43), aftermarket applications 32 including those that are added to the vehicle after it has been shipped, and nomad applications 33 like mobile phones, portable media players (e.g. CD players) or hand held navigation systems like a GPS receiver.

Finally, the fourth main component is the driver information unit 4. This central unit is of primary importance and contains an interaction manager 41, a driver/vehicle environment (DVE) state estimator/predictor 42 and the integrated human machine interface (HMI) 43 (which has been mentioned above) for communicating and/or interacting with the driver D (arrow A2).

The interaction manager 41 contains the hardware/software (e.g. for realizing a prioritization algorithm and a waiting queue, as explained below) for managing the driver's communication and/or interaction with the integrated ADAS/IVIS modules and applications 2 via the integrated HMI 43 (arrow and with the stand-alone applications 3 via the non-integrated HMIs 34, in dependence of the real-time input from the driver/vehicle environment (DVE) state estimator/predictor 42 (arrow A3).

The DVE state estimator/predictor 42 computes a (potentially) multidimensional estimate of a current and/or a predicted DVE state on the basis of output signals of the sensor array 1 (arrow A4) and/or the output signals of at least one of the integrated applications 2 (arrows A5 and A9) and continuously outputs a corresponding DVE state vector to the interaction manager 41 (arrow A3).

This state vector for example comprises and/or is established on the basis of at least one of the following criteria or parameters: primary task demand (e.g. the complexity of the driving situation and how critical the situation is for the driver), secondary task demand (e.g. driver activity focused on other tasks than the primary driving task), visual distraction, physiological driver impairment (like drowsiness, drug influence), driver characteristics (age, experience, etc.), specific driving situations (e.g., overtaking another vehicle), the overall driving environment type or context (e.g. highway, country road, city, rural, suburbia or city), as well as the driver identity.

These criteria or parameters of the state vector can be computed by a sub-module within the DVE state estimator/predictor 42 on the basis of one or more sensor signals of one or more sensors in the sensor array 1 (arrow A4) of one or more output signals of the integrated applications 2 (arrow A5 and A9), e.g. the driver state signals (e.g. sensor signals indicating gaze direction and alertness), the vehicle state signals (e.g. sensor signals indicating speed, acceleration, steering wheel angle, pedal positions, gyro signals, tyre pressure) and/or the environment state signals (e.g. sensor signals indicating road type, road surface condition, surrounding obstacles, geographical position etc.).

The DVE state estimation may include a prediction of future states as well. The exact definition of the DVE state vector is based on the needs of the interaction manager 41 (i.e. what information is required for the interaction management functions).

Finally, the driver information unit 4 comprises the integrated human machine interface (HMI) 43 which is the main interface between the driver D (arrow A2) and the integrated ADAS/IVIS modules and applications 2 (arrow containing one or more I/O devices 431 for enabling the driver D to communicate and/or interact with the system in different sensory modalities or via different sensory channels (visual, auditory, haptic). The stand-alone applications 3 may, but not have to, use the integrated HMI 43 because these applications 3 usually have their own built-in HMIs. So the driver D potentially can communicate and/or interact with the stand-alone applications 3 via their own built-in HMIs (arrow 34).

A first main feature of the inventive method conducted by the system according to FIG. 1 is the scheduling of applications-initiated information, i.e. any communication interaction with the driver D, in dependence of a current and/or predicted driver/vehicle environment (DVE) state.

A second main feature is that, when communications and/or interactions with the driver D are initiated simultaneously by several different applications 2,3 (including the case in which request is queued and awaiting approval and a request for a second communication and/or interaction is received) the system selects the most important communication and/or interaction on the basis of a prioritization (according to certain criteria, see below). Other communications and/or interactions are put in a waiting queue and are performed later in order of priority.

Both these features shall now be explained in more details.

When a non-integrated application 3 is connected to the system (vehicle network) via a wireless or physical link an initiation by the interaction manager 41 (or the application 3) is included e.g. in the well-known handshake between the application 3 and the system. The interaction manager 41 checks if the application is compatible with the interaction manager 41, i.e. whether the application can be controlled by the interaction manager 41. If the application does not have such compatibility by default, the interaction manager 41 (or the application 3) checks for the possibility to download and/or install an appropriate software required to make the application 3 compatible with the interaction manager 41.

If such a software is downloaded by and successfully installed in the application 3 and/or the interaction manager 41, or if the application is compatible with the interaction manager 41 from the start, the interaction manager 41 dynamically assigns an identification number to the application which is unique in this system to the application. This application will keep the assigned identification number as long as it is connected to the interaction manager 41 i.e. as long as the link between the application and the system exists. After termination of the link and connecting the application again, a new (possibly as well the same) identification number is assigned to the application.

Before an application 2,3 communicates and/or interacts with the driver D, it has to execute a first routine with the interaction manager 41 (arrows A6 and A7) which comprises e.g. the following steps:

1. Generating and sending a request, preferably in a standardised format (see below) to the interaction manager 41 for permission to communicate and/or interact with the driver D, e.g. in the form of presenting a specified piece of information or a message;

2. Awaiting a response (preferably in a standardised format as well, see below) from the interaction manager 41. This response comprises an indication about either (a) "permission granted—go ahead" or (b) "permission denied—wait and hold the communication and/or interaction";

3. If no response has been received within a certain time period (normally the request is sent again. This step can be repeated n times (n=predefined=0, 1, 2, . . . ) Finally, if still no response is received, a diagnostic message is output.

Preferably, a request is sent a few times (e.g. 3 to 10) to consider a possible loss of the request on the bus or the wireless LAN. However, after a few tries it is supposed by the application sending the request that the interaction manager 41 is no longer available (e.g. that there are some problems with the interaction manager 41) and the application output a diagnostic message e.g. on a diagnostic bus, but preferably does not communicate and/or interact with the driver with respect to this message.

This procedure is applicable as well for an application to detect whether there is an interaction manager 41 present in a specific system or not. This might be of relevance if certain applications shall be used in a system without any interaction manager as well. In order for this application to use the same software in both systems the application has to check if an interaction manager is present or not. If there isn't any, the application will switch over and work in a stand-alone mode i.e. it will communicate/interact with the driver regardless of the state of the driver and/or the HMI and/or the vehicle the environment. Otherwise it follows the above described routine. Thus, the same application can be used both in interaction manager controlled systems as well as in systems without an interaction manager. By this, the modularity of the applications (especially for use in certain truck models) is increased considerably.

4. If the request is finally denied, permission is awaited from the interaction manager 41 to communicate interact with the driver D in the requested way.

The corresponding part of the first routine to be executed by the interaction manager 41 when a request is received from an application 2,3 comprises e.g. the following steps:

1. Determining whether the requested communication and/or interaction can be permitted in dependence of a current and/or a predicted DVE state and/or whether requests have been received from other applications 2,3;

2. If permission can be given, sending a response comprising an indication (a) "permission granted-go ahead" to the application 2,3 from which the request was received;

3. If permission cannot be given, storing the request in a waiting queue and sending a response to the related application 2,3 comprising an indication (b)"permission denied-wait and hold the communication and/or interaction" and possibly an instruction to await further responses;

Such a response can include an indication regarding the number of the request in the waiting queue. Preferably, in this case the response is repeated circularly or whenever another request with a higher priority has left the waiting queue.

4. If permission can be given, and one or more requests are stored in the waiting queue, picking up the request of the application 2,3 which has the highest priority and sending a response comprising an indication "go-ahead" to this application 2,3. This is repeated until all requests stored in the waiting queue have been permitted.

If an application withdraws it's request, it preferably sends a delete message to the interaction manager instructing the same to remove the request from the waiting queue. This is handled according to the description below with respect to "dynamic priorities".

For certain applications 2, 3 which e.g. generate highly safety-critical message types, this routine may be skipped entirely, and the message is pushed through regardless of what requests are stored in the waiting queue. As an alternative, highly safety-critical messages could also be included in the prioritization (but not in the scheduling) and handled by the interaction manager. Thus, such highly safety-critical messages preferably but not necessarily can be handled regardless of the DVE state, but they follow the same procedure as for other requests. If this procedure requires too much time, another alternative is to let the safety-critical message push through only if no other such safety-critical message with a higher priority is currently being directed to the driver (so that if several applications and/or systems go off in a certain scenario only the safety critical message with the highest priority will get pushed through).

In these cases the current non-safety-critical request is preferably put into the waiting queue (again) with the highest possible priority allowed for non-safety-critical requests and is permitted according to the above first routine and/or as soon as the safety-critical message (s) have been presented.

The details of the data flow protocol for these requests and responses shall now be described in more details.

The requests for communicating and/or interacting with the driver D, sent to the interaction manager 41 by the different integrated and/or non-integrated applications 2,3 as well as the responses generated and transmitted by the interaction manager 41 preferably follow a standardised format.

Such a format and data structure for the requests sent by an application comprises e.g. the following fields:

1. Application Identification:

This field contains an identifier of the application 2,3 sending the request. For nomad applications 33, this identifier may be dynamically assigned to the application 33 by the interaction manager 41 as described above, when and as long as it is connected to the vehicle network. The data type is preferably "integer";

2. Communication and/or Interaction Identification:

This field contains an identifier of the communication interaction (e.g. a message "low fuel", an incoming phone call, a vehicle diagnostic message, a route guidance message etc.) with the driver D, requested by the application 2, 3. The data type is preferably "integer". The identifier, however, has no connection to the type of communication/interaction itself, but is just an (integer) number.

3. Priority Index:

This field contains preferably a floating number representing a priority index of the communication and/or interaction, established by means of a standardised method, e.g. SAE J2395. Representing the priority index by a float rather than by an integer has the advantage that it creates unique priorities. Otherwise, if two communications interactions with the same priority index are initiated, the well-known first-in-first-out principle (i.e. the message that was initiated first is presented first) is preferably applied. Therefore, the data type is preferably "float".

The responses of the interaction manager 41 are preferably represented by a standardised format and data structure which contains e.g. the following fields:

1. Application Identification:

This field comprises the identifier of the application 2,3 sending the request. The data type is preferably "integer";

2. Communication and/or Interaction Identification:

This field indicates the identifier of the communication and/or interaction (e.g. as mentioned above) requested by the request. The data type is preferably "integer"

3. Answer:

This field contains the answer to the request, comprising an indication about either communication and/or interaction". The data type is preferably "Booelan", e.g., "1" for (a) and "0" for (b).

These routines constitute a simple way to control any application 2,3 that follows the standard formats and data structures specified above, without the need for the interaction manager 41 to keep an updated list of all applications 2,3 and an updated list of all the communications and/or interactions (which the related application can perform) and their priorities (as in the prior art according to the GIDS-project). This is particularly useful in the case of nomad applications 33, which in the near future could be expected to seamlessly connect to the vehicle data bus, e.g. via a wireless link (such as Bluetooth).

A possible realization of these routines shall be illustrated in the following by an example:

A nomad application manufacturer is developing a certain PDA. He lists all possible communications and/or interactions initiated by the PDA and assigns a priority index to each of them, using a standardised method (e.g. in accordance with J2395) and storing a related table in the PDA. In practise, this could also be done by an authorized institution. Instead of listing all possible interactions and/or communications the manufacturer can list groups of possible interactions and/or communications and assign the same priority to the entire group. This may be advantageous if it is impossible to anticipate all possible interactions/communications especially if there are dynamic interactions/communications.

The routine described above with respect to sending requests to and receiving responses from the interaction manager 41 is implemented in the PDA as well so that it, when connected to the vehicle bus (and after the interaction manager 41 assigned an application identification to the PDA as described above), always sends a request with respect to the desired communication and/or interaction (and its priority) to the interaction manager 41 and awaits a response indicating said permission, before communicating and/or interacting (e.g. presenting an information and/or initiating an action) with the driver D.

Another possibility is to provide an adapter especially for those applications which are not suitable for storing said table and/or for implementing the above routine. In this case the adapter has the function of an interface to the system and conducts the above routine.

In case of an application, e.g. a mobile telephone, which is not compatible with the interaction manager, the application or the interaction manager could also download from the internet or via a service provider a software for achieving the capability of interaction between the application and the interaction manager. This might be subject to a subscription or the like requiring a that the right person/application is requiring such an adapter program (e.g. in case that this costs a fee). To safeguard this an encryption can be used like e.g. a public key encryption method.

Summarizing, the interaction manager 41 does not need to know which application 2,3 had sent the request. It is sufficient that the interaction manager 41 knows that an application X is asking for permission to perform a communication and/or interaction Y (e.g. presenting a message), preferably with a priority index P, without knowing what X and Y actually are. The only extra standardisation needed is a specified format and data structure or protocol for requests and replies, e.g. as disclosed above.

The format and data structure can be extended to contain additional information of the communication and/or interaction to be performed. This information could be optional (if this information is missing it is replaced by default values).

As an alternative to a predefined data sequence structure having default values if certain data are missing, it is possible to assign to each possible type of data (application identification, communication interaction identification, priority inconnected to it and which enables the interaction manager to identify the type of data following this code/address. This is in other words a sort of dynamic protocol which for example looks like: "Application ID": XX, "Message ID": YY, "Priority index": ZZ, and then the next field could be any other data, but—preferably preceeding the data—there is an identifier e.g. "Duration": AA or "Auditory Load": BB.

Some examples of additional information that could be added to the requests are given as follows:

4. Duration of the Communication and/or Interaction:

This field indicates the estimated time that the driver needs for the communication and/or interaction, e.g. in case of a message, to comprehend the message. This is also the time before a subsequent communication interaction can be performed (in seconds). The data type is preferably "float";

However, it is preferred that safety-related requests (or any other request of a certain, predefined priority) are always be processed immediately irrespective whether another message/action of lower priority is currently active. The high priority message/action will be forwarded interrupting the other message/action. In sum, the preferred procedure for handling safety-critical messages, e.g. warnings (with priority above a certain threshold) is the following:

a.) the message is pushed through irrespective of the DVE state;

b.) the message overrides any message with lower or medium priority currently active, wherein such current message is preferably put on hold into the waiting queue with the highest possible priority allowed for non-safety-critical messages (or requests);

c.) several safety-critical messages initiated roughly simultaneously are presented in order of priority.

5. Visual load: This field indicates the load imposed on the visual channel to the driver. The data type is preferably "integer";

6. Auditory load: This field indicates the load imposed on the auditory channel to the driver. The data type is preferably "integer";

7. Haptic load: This field indicates the load imposed on the haptic channel to the driver. The data type is preferably "integer".

A first preferred extension of the inventive method is the handling of dynamic priorities:

For some applications 2,3, the priority of a request may change over time. One example of this is a route guidance message such as "turn right at the next intersection", which becomes more urgent and important the closer the vehicle comes to the intersection. A simple way to consider such dynamic priorities is to use multiple requests with the same identification but different priorities, e.g. a first request for a message when there are 100-200 meters left to the intersection and a second request for the same message when there are less than 100 meters left to the intersection.

However, this requires that the first request is taken out of the waiting queue at the interaction manager 41 when it becomes irrelevant and is replaced by the updated request. In other cases, it may be necessary to delete a request from the waiting queue without replacing it.

Another example is the case in which the request for an incoming call is denied by the interaction manager. The phone application may send an updated request (same message ID) with a higher priority after some time e.g. 5 seconds because answering the call has become more urgent since the risk of the caller hanging-up increases with time. An important feature of this system is that the risk of loosing a call or information is reduced. Preferably, the caller gets a periodically updated information about the number or plane of his call in the waiting queue.

In order to accomplish such dynamic priorities, the standard format (protocol) of the request is extended by a field specifying the requested operation on the waiting queue as either add_request, replace_request or delete_request as follows:

8. Type of request: This field indicates the type of the request (or action), which can take three values: 0=add_request, 1=replace_request and 2=delete_request. The data type is preferably "integer".

A third main feature of the inventive method is the control of the service state (i.e. the control of the mode of operation or function) of the applications 2,3 by means of the interaction manager based on and in dependence of a current and/or a predicted DVE state. This could include, for example, the enabling and/or disabling of functions of the applications 2,3 (or one or more of the entire applications) and/or a real-time re-configuration of the related HMI 34,43.

According to an exemplary and preferred embodiment of the invention, this is accomplished for the integrated HMI 43 by configuration of the same under direct control of the interaction manager 41 as illustrated by arrows A8 in FIG. 1.

For non-integrated (stand-alone) applications 31 having their own built-in HMI 34 the configuration is controlled by the interaction manager 41 by sending instructions to these applications These instructions are considered as an additional message type and have a standardised format (protocol) so that it can be used by the interaction manager 41 to control e.g. the service state or the mode of operation or function (s) of these applications 2,3 or to configure the related HMI 34,43, including enabling and/or disabling one or more of the entire applications 2,3.

One possibility for realizing this is to establish and provide a set of standardised driving situations S1 . . . Sn that can be recognised by the DVE state estimator/predictor 42. A simple case would be two types of situations: S1=vehicle standing still and S2=vehicle moving. If more advanced DVE monitoring techniques are used, the situations may include, for example: S1=standing still (engine shut off=parking), S2=standing still (engine idling=temporary stop at a traffic light or intersection), S3=driving on the highway, S4=driving in the city, S6=driver is drowsy and so on.

The current driving situation index Sn is then distributed to all non-integrated (stand-alone) applications 3 (possibly to the integrated applications 2 as well) by the interaction manager 41. The developer of these applications 3 would then have to define a look-up table specifying how the service state or mode of operation or function (s) is determined by the current driving situation index Sn. Such a look-up table for situation-dependent control of the service state or mode of operation or function (s) of non-integrated applications 3 is exemplified in FIG. 2. In this example, the service state is defined by the enabling/disabling of certain functions F1 to F8 of the related application depending on the drivers situation index S 1 to S4.

Figure 2:
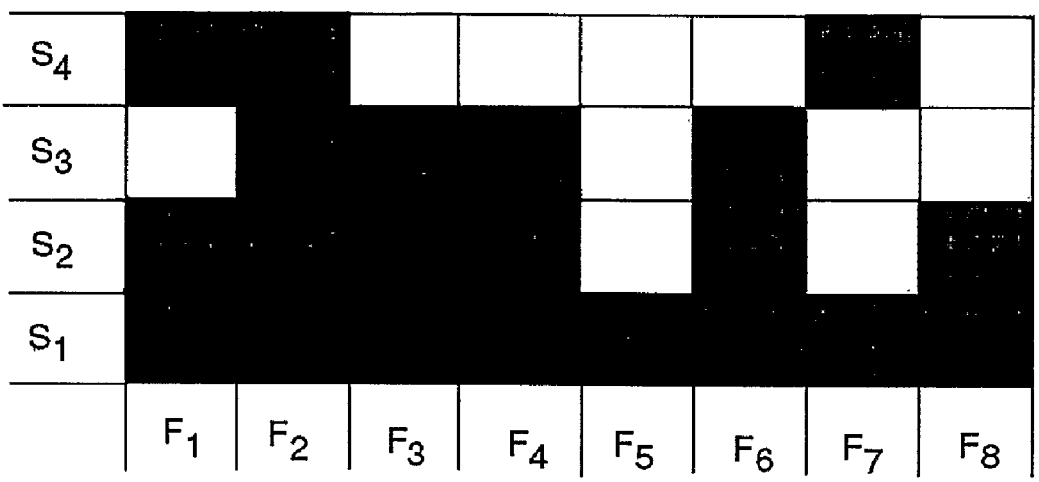
FIG. 2 a look-up table for a DVE state-dependent control of the service state or functions of an in-vehicle application according to the invention.

As a simple example, assume that F5="DVD player" and standing still (engine shut The table in FIG. 2 thus specifies that the DVD player should only be enabled when the vehicle is parked (a black box indicates that function is enabled, a white box indicates that a function is disabled).

The look-up table could be generalised to represent more complex service states than mere enabling/disabling of functions. In a simple example, this table contains dual states of the type "on"/"off" or"loud"/"quiet" or "bright"/"dark" etc. In a more advanced system this table may have n states (very loud, loud, neutral, more quiet, absolute quiet) which then are a function of the DVE parameters as well.

This control thus requires a message type that the interaction manager 41 could use to distribute the driving situation index Sn. The proposed message format for enabling/disabling functions (distributed by the interaction manager) preferably comprises only one index which is specified as follows:

Driving Situation Index:

This field is preferably an integer-value representing the current general driving situation index Sn.

A second preferred extension of the inventive method is the handling of a text-to speech or text-to-display output by means of a text-converter:

Text-to-speech or text-to-display is likely to be a common type of HMI in future vehicles. The basic idea is to give the driver access to longer texts (e.g. emails) without imposing excessive visual distraction when reading it as a whole from a display. However, comprehending the spoken text still imposes a cognitive load on the driver, which may contribute to overload in demanding and/or critical driving situations. Passengers in the car talking to the driver usually avoid this problem by pausing when the workload of the driver increases by the driving task. The idea of the proposed function is to schedule the text output based on the output from the DVE state estimator/predictor. The general principle is illustrated in FIG. 3.

Figure 3:
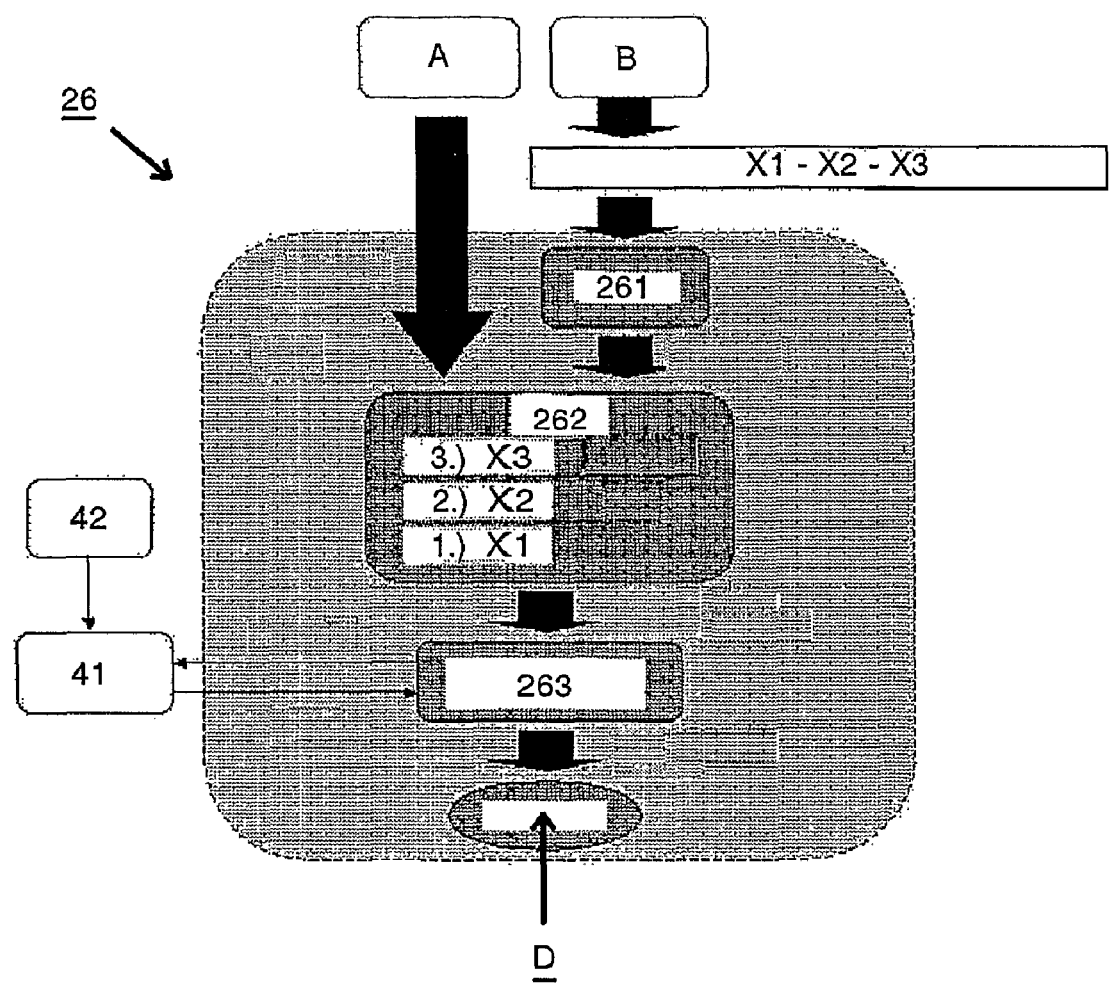
FIG. 3 an embodiment of another application according to the invention.

FIG. 3 shows a preferred embodiment of a text-converter 26 which can be considered as a specific form of an application that can be an integrated or a non-integrated application 2,3. Two different cases have to be considered with respect to the text to be output:

a) pre-chunked messages, e.g. a route guidance message generated by a route guidance system A and b) non-pre-chunked messages, e.g. an e-mail generated by an e-mail or SMS system B for which real-time parsing is necessary.

The application 26 is generally handled according to the methods outlined above. In the preferred embodiment as illustrated in FIG. 3, the following procedure is executed:

1.) The raw text (standing for any text comprising the text segments X1, X2, X3 to be converted to speech and output) is initiated by an information system like a route guidance system A and/or an e-mail or SMS system B. (X1, X2, X3 could be a paragraph, a sentence, a phrase, a word, a letter, a figure, 2a). In the first case (route guidance system), the text may be chunked up in advance by the information system itself This is generally possible for pre-defined messages (route guidance messages or similar messages). In this case, the message is passed directly to a waiting queue 262 provided within the application 26.

2b.) Alternatively, the messages may not be pre-chunked, as is the case for e-mails and SMS (B). In this case, the raw text is fed into a parser 261 which segments the text into grammatical categories (a parser 261 is a piece of software that employs a stored lexicon and a grammar in order to segment a text into hierarchical grammatical categories like e.g. paragraphs, sentences, phrases, words etc.).

The parser 261 thus slices up the text "X1-X2-X3" into chunks X1, X2 and X3 (e.g. phrases), which are then put into the waiting queue 262 in order of presentation.

A simpler alternative to grammatical parsing would be to just look for specific dividing characters, e.g. comma, punctuation and/or colon in order to divide the text into meaningful chunks.

3.) The text chunks X1, X2 and X3 are treated like communications and/or applications according to the method described above. Thus, the speech generator 263 sends requests to the interaction manager 41 and waits for responses confirming that presentation is permitted.

4) If a chunk X1, X2, and/or X3 is held for longer than a certain first period of time, e.g. 10 seconds, the previous chunk is preferably repeated in order to facilitate understanding. If a chunk X1, X2 and/or X3 is held for longer than a second period of time (e.g. 20 seconds), the two previous chunks are repeated and so on.

Instead of repeating individual text chunks or groups of such chunks as a function of the waiting time irrespective whether the repeated chunks form a logical unit, in a more advanced system the system will repeat those chunks which form logical units (a whole sentence instead of a word or a phrase, or a whole paragraph instead of a sentence, especially in case the waiting time has been too long). The parser 261 might be an intelligent one which recognises not only grammatical structures, but also content (a semantical parser). Methods used in natural language processing systems might be applicable here to identify such logical units.

5.) When a message is interrupted (i.e., a chunk is held), the driver is preferably informed on this, e.g. by a characteristic tone or a short voice message as e.g. "Message interrupted" or "Stop".

Instead of the speech generator 263, an appropriate display (not illustrated) could be provided for displaying the text chunks X1, X2, X3, if the display is provided (by additional means) to send requests to the interaction manager 41 and to wait for responses confirming that displaying a chunk on the display is permitted.

Finally, each text chunk X1, X2, X3 can be outputted as speech and displayed on a display simultaneously or with a time delay as well, so that the driver can both listen to and read the text on a display.

Although this embodiment of the invention is for managing and outputting voice messages, the general principles illustrated in FIG. 3 could be applied to other message types as well.

Figure 4:
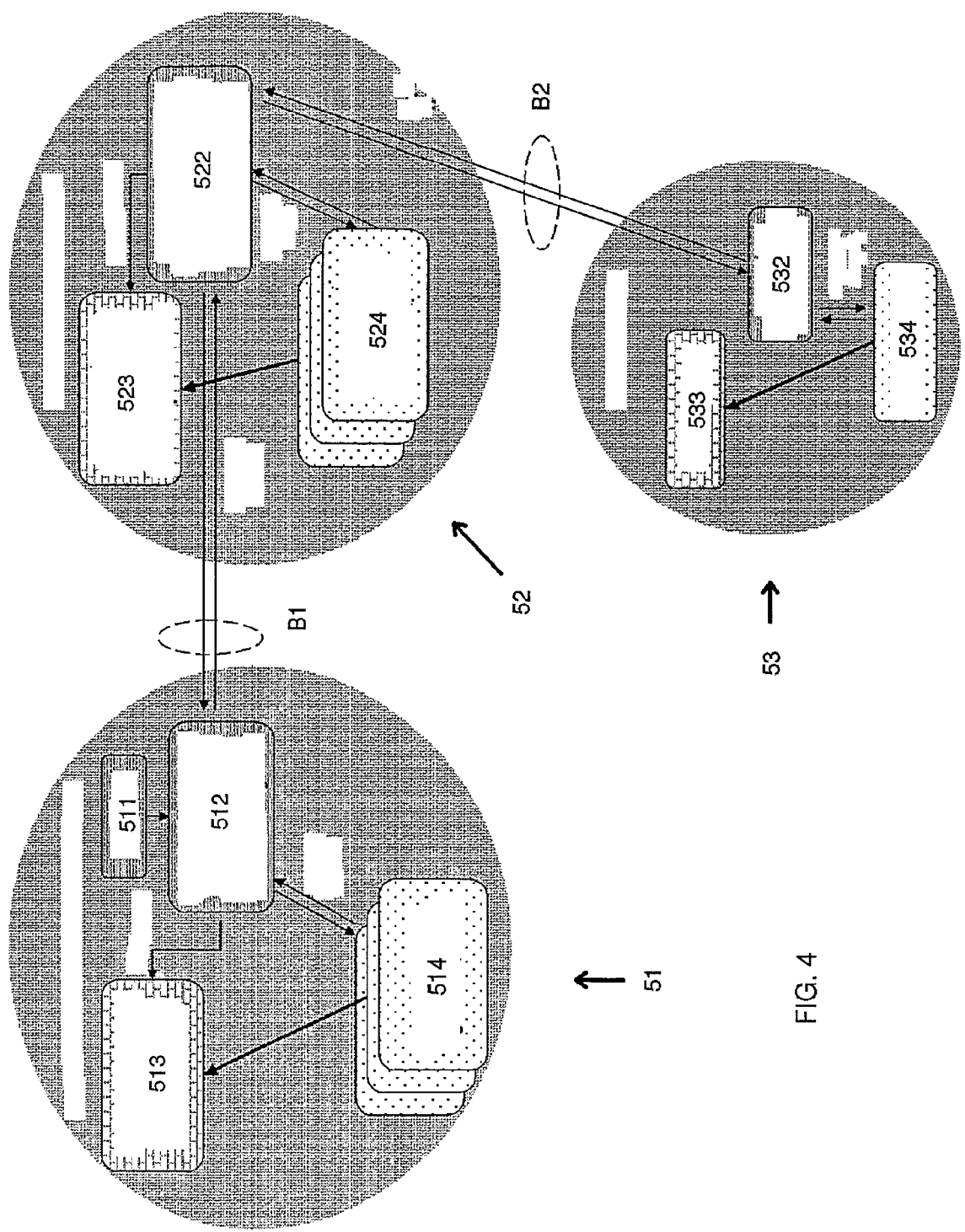
FIG. 4 a second functional architecture of an exemplary and preferred embodiment of a system according to the invention.

FIG. 4 shows a second functional architecture of an exemplary and preferred embodiment of a system according to the invention. This system substantially comprises a central unit 51 and a plurality of local units, in this example two local units 52,53.

The central unit 51 comprises an interaction manager or driver vehicle environment manager 511 which controls a main information and resource manager 512. This main information and resource manager 512 is provided for information management and for resource management and controls one or more HMI-devices 513, like e.g. a display and/or a speaker. Furthermore the main information and resource manager 512 receives requests from a plurality of applications 514 (e.g. a radio, an control unit ECU, VECU, etc) and sends responses to these applications 514 as explained above for permitting or not permitting communication with the HMI-device 513, wherein the applications 514 are connected with the at least one HMI-device 513.

FIG. 4 shows a first local unit 52 which is additionally functioning as well as a gateway unit via e.g. a CAN or LIN bus B2 for the second local unit 53 mentioned below. The unit 52 comprises a local resource manager 522 which is provided for resource management and not for information management and which again controls one or more HMI-devices 523 like e.g. a display and/or a speaker e.g. in the form of an integrated or non-integrated HMI.

The first local unit 52 furthermore comprises a plurality of applications 524 like e.g. send requests to the local resource manager 522 and receive responses from it as explained above with respect to FIGS. 1 to 3. The applications 524 are again connected with the HMI-devices 523 for communication with the same.

Furthermore, the local resource manager 522 is connected e.g. via a CAN bus B1 with the main information and resource manager 512 within the central unit for sending requests and receiving responses from it according to the methods disclosed with reference to FIGS. 1 to 3.

The second local unit 53 for example in the form of other systems of the vehicle again comprises a local resource manager 532 which is provided for resource management and not for information management.

Again, the second local unit 53 according to FIG. 4 comprises at least one applicaving its own and/or an integrated or non-integrated HMI-device 533 for controlling the same after having sent a request to the local resource manager 532 and having received a related response from it as explained above.

Finally, the local resource manager 532 is connected e.g. via a CAN bus or LIN bus B2 with the local resource manager 522 of the first local unit 52 which is oning as a gateway so that the local resource manager 532 can send requests to and receive responses from the main information and resource manager 512 within the central unit 52.

By this second architecture, a central information management but a distributed resource management is provided. This means that within the local units 53 (and possibly between the local units 52,53) only a resource management is conducted by the local resource managers 522,532, whereas between a local unit 52; 53 and the central unit 51 (possibly via another local unit as a gateway) an information management and, if necessary, a resource management is provided.

This architecture offers a greater flexibility because it can be more easily adapted to different vehicles with different needs and different local units and it is relatively easy to connect further local units to the system especially if a common bus system (especially a CAN bus) B2 is used.

It is especially advantageous if a central unit 51 is provided with a basic ty which is standard equipment for all manufactured vehicles and which fulfills the needs for the typical user of such a vehicle. Optionally, the of such a basic system can be expanded by one or more specific or local units ("add-on-modules") 52,53 which in case of special needs fulfill special functions and can be built in separately after the manufacturing of the vehicle as well.

Figure 5:
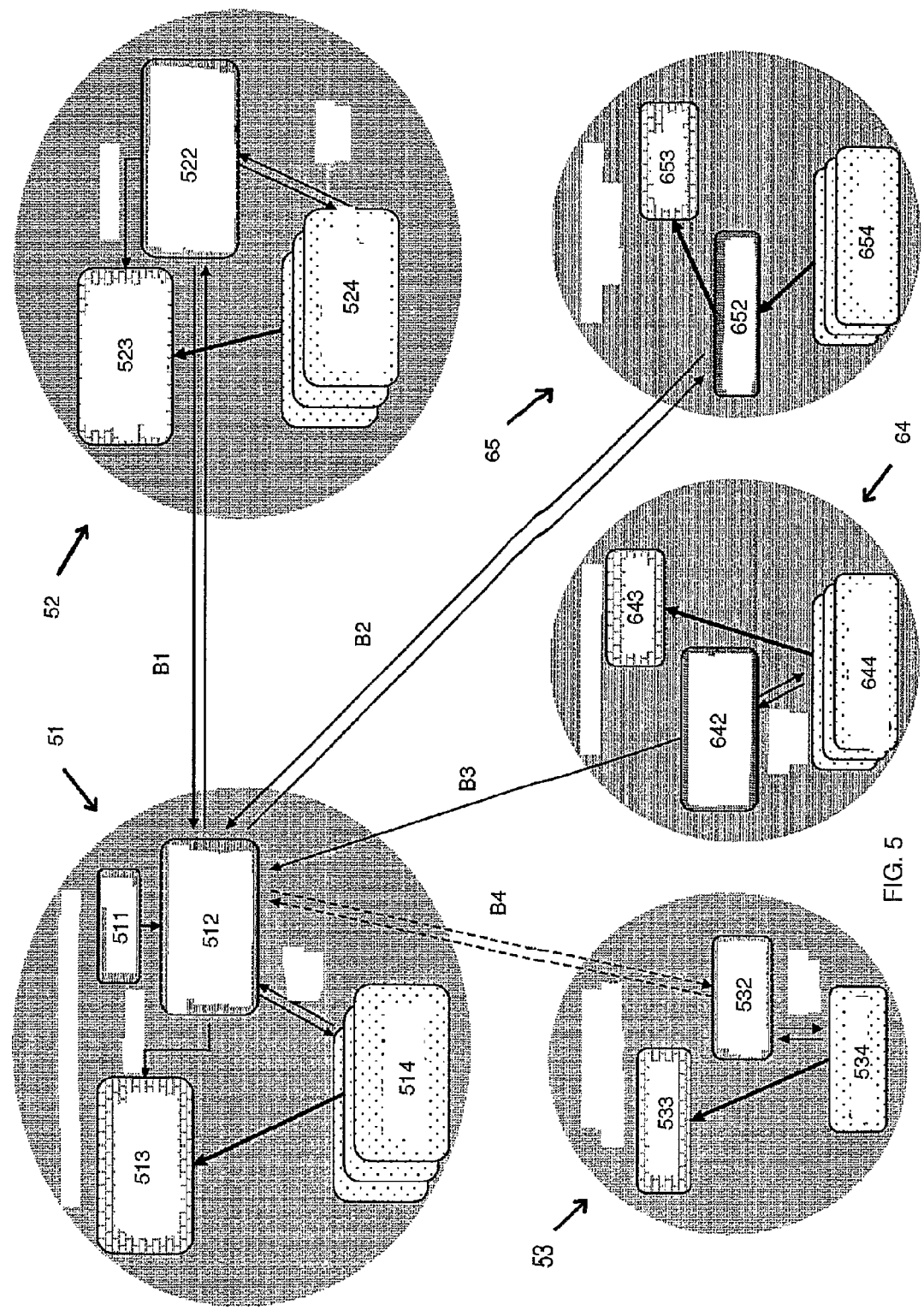
FIG. 5 a third functional architecture of an exemplary and preferred embodiment of a system according to the invention.

FIG. 5 shows a third functional architecture of an exemplary and preferred embodiment of a system according to the invention which in contrary to the gateway-architecture shown in FIG. 4 is a star network architecture. However, both architectures can be combined as well.

Again, a central unit 51 is provided comprising substantially the same components as the central unit 51 in FIG. 4. However, the main information and resource manager 512 is provided according to the needs of the star network architecture. Preferably, a first local unit 52 and a second local unit 53 is provided as well which again correspond with the first local unit 52 and the second local unit 53, respectively, as disclosed in FIG. 4. With respect to these units 51,52 and 53 it is referred to the description in connection with FIG. 4 above.

The system architecture according to FIG. 5 furthermore comprises a third local unit 64 and a fourth local unit 65. The third local unit 64 is provided e.g. with a time critical functionality e.g. in the form of a safety and/or a warning (alert) unit which comprises an active safety HMI manager 642 which receives requests and sends responses to a plurality of related safety applications 644 like e.g. a FCW (forward collision warning), a LDW (long distance warning), an ACC (adaptive cruise control) etc.

Furthermore, a display 643 is provided which is controlled by these applications 644. A basic difference between this third local unit 64 and the other local units 52, 53 and 65 is, that because of its time critical the active safety HMI manager 642 only submits an information signal via a bus B3 informing about a warning condition to the main information and resource manager 512 within the central unit 51 in case it receives a related request from at least one of the safety critical applications 644 (and sending a response to these for generating warning or alert signals on the display 643) as well.

As an example of another local unit which can be connected to the system architecture FIG. 5 shows a local unit 65 which comprises a local resource HMI manager in the form of an AMI-C (automobile multimedia interface-collaboration) content based HMI manager 652 which controls a related display 653.

This unit 65 furthermore comprises a plurality of applications 654 which are provided for transmitting content-based information preferably in the XML format via the unit 652 to the display 653. The principles of the AMI-C content based HMI are disclosed in SAE Technical Paper Series 2004-01-0272: L. Jalics and F. Szczublewski: "AMI-C Content-Based Human Machine Interface (HMI)", March 2004, which is incorporated by reference to be made a part of this disclosure.

Again, according to the above methods as described with reference to FIGS. 1 to 3, the HMI manager 652 can send requests to the main information and resource manager 512 in the central unit 51 (via a bus B2) and can receive responses from it before it allows e.g. displaying the content transmitted by one of the applications 654 on the display 653.

If e.g. a warning signal has been transmitted from the active safety HMI manager 642 to the main information and resource manager 512 via the bus B3, the HMI manager 652 receives a related response signal via the bus B2 and switches off the application 654 which is going to transmit its content to the display 653. The content based applications 654 can as well be nomad applications.

The system architecture as shown in FIG. 5 has substantially the same advantages as those mentioned in connection with FIG. 4. Generally the communication between the central unit and the local units can be conducted via the same or different local bus systems B2, B3, B4 provided within the vehicle wherein wireless communications systems like Blue Tooth can be used as well. Furthermore the protocols for transmitting signals between the units and within the units can be the same or different.

As mentioned in the introductory part, the inventive methods, systems and applications are not limited to the communication and/or interaction with a vehicle driver.

For example, instead of a vehicle driver, the human being can be a captain or skipper of a motor boat, a sailing boat or another yacht or ship. In these cases, nomad applications 33 are e.g. mobile phones, portable media (e.g. CD-) players, portable radios, PDAs and/or hand held navigation systems like a GPS receiver etc. which the captain or skipper brings on board and uses during the operation of the yacht, boat or ship and which are handled according to the disclosure with respect to the above nomad applications 33.

The inventive methods, systems and applications are accordingly applicable in control stations for controlling and guiding ships in the vicinity of harbours and/or other areas or waterways with a high traffic density. In these cases, the human being is a traffic controller or officer who uses e.g. his own mobile phone or another nomad application 33 during supervising the ship traffic, wherein the mobile phone etc. is handled according to the disclosure with respect to the above nomad applications 33.

Furthermore, the inventive methods, systems and applications are accordingly applicable in power plants and in the industry and especially in control rooms where the human being is an operator who has to supervise and make sure that e.g. processes are running correctly. In this case, different alarms/messages for various events could be controlled by an interaction manager according to the above disclosure. If e.g. a malfunction occurs, only the most important and critical information (the information that requires immediate reaction by the operator) will be passed through. Different processes or components of processes can be considered as different applications with unique identifications. Additionally or alternatively, the operator can use e.g. his own mobile phone or another nomad application 33 during supervising the power plant, wherein such mobile phone etc. is again handled according to the disclosure with respect to the above nomad applications 33.

The inventive methods, systems and applications can for example be applied for air traffic controlling as well. In this case, the HMI 43 could be the interface between the air traffic control computer and the human being who is e.g. an air traffic controller. Aeroplanes could be considered to be nomad devices that fly in and out of the control zone being controlled by the air traffic control tower. Aeroplanes that enter the control zone use their transponder signal as identification. All communication between the air traffic controller and the pilot of the aeroplane is then conducted according to the inventive methods, systems and applications disclosed above. The aeroplanes can use dynamic priorities so that e.g. a message will become more urgent the closer the aeroplane comes to the control tower. The DVE-state could be based on the amount of information currently being processed by the air traffic controller and/or the number of aeroplanes currently flying within his control zone. Safety critical messages, e.g. when two airplanes fly very close to each other, are treated in the same way as disclosed above with respect to safety critical messages. If a controller uses an own mobile phone or another nomad application as mentioned above, this is again handled according to the disclosure with respect to the above nomad applications 33.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. Method for at least one of communication and interaction between a vehicle driver and a plurality of at least one of integrated and non-integrated applications, by a routine executed by an interaction manager and by each application before at least one of communicating and interacting with the driver, wherein the routine comprises the following steps:

sending a request by an application of the plurality of applications to the interaction manager for permission to at least one of communicate and interact with the driver;

determining by the interaction manager whether a permission for the requested at least one of communication and interaction can be given, in dependence of at least one of a current and predicted driver/vehicle environment (DVE) state and of other requests which have been received before from at least one of this and/or other applications;

generating and transmitting a response by the interaction manager to the application, comprising an indication about permitting or not permitting the requested at least one of communication and interaction;

if the indication permits the requested at least one of communication and interaction, conducting the requested at least one of communication and interaction with the driver solely by the application; and if the indication does not permit the requested at least one of communication and interaction, not conducting the requested at least one of communication and interaction and awaiting permission from the interaction manager by the application to at least one of communicate and interact with the driver.

2. Method according to claim 1, wherein a priority index is assigned to at least one of the communications and interactions of at least one of the applications, wherein the priority index is submitted together with the request and wherein the determination of permission/non-permission is conducted by the interaction manager in dependence of the priority index.

3. Method according to claim 2, wherein the priority index is established by means of a standardized method.

4. Method according to claim 1, wherein the related request is stored in a first waiting queue in case the interaction manager determines that permission can currently not be given for the requested at least one of communication and interaction.

5. Method according to claim 1, wherein at least one of the requests comprises at least one of the following information about: an identification of the application sending the request, a duration and/or identification of at least one of communication and interaction requested by the request, a visual load, an auditory load and/or a haptic load, each imposed on the driver by the requested at least one of communication and interaction, and type of the request.

6. Method according to claim 2, wherein the same request can repeatedly be sent, preferably with different priority indices, in case the interaction manager determined that permission cannot be given for a requested at least one of communication and interaction.

7. Method according to claim 6, wherein when the same request is repeatedly sent, the request comprises an information regarding its type which indicates whether to add this request to a first waiting queue or to replace or to delete another request already stored in the first waiting queue or the request is sent n-times (n=1, 2, 3, . . . ) in case no response is received from the interaction manager.

8. Method according to claim 1, wherein at least one of the responses comprises at least one of the following information about: an identification of the application which sent the related request, an identification of the at least one of communication and interaction requested and/or an answer related to the determination whether a permission for the requested at least one of communication and interaction can be given or not.

9. Method according to claim 1, wherein the application is a text converter, preferably a text-to-speech-and/or a text-to-display converter and wherein the at least one of communication and interaction is provided for outputting at least one of a non-text message to the driver and a message on a display.

10. Method according to claim 9, wherein the text is output as speech and/or displayed on the display, respectively, in the form of chunked segments and wherein each segment is considered as at least one of communication and interaction.

11. Method according to claim 10, wherein the chunked segments are combined to form at least one logical unit when output.

12. Method according to claim 10, wherein the chunked segments are stored in a second waiting queue, until a request for outputting a segment is responded by the interaction manager permitting such output.

13. Method according to claim 12, wherein the chunked segments are stored in the second waiting queue until all segments have been output and wherein at least one of the stored segments can be output again if the segments are stored in the second waiting queue longer than a predetermined time.

14. Method according to claim 10, wherein chunked segments are generated from non-pre-chunked messages by means of a parser.

15. Method according to claim 1, comprising evaluating at least one of a current and a predicted driver/vehicle environment (DVE) state on the basis of at least one of the following criteria: primary task demand, secondary task demand, visual distraction, physiological driver impairment, driver characteristics, specific driving situations, overall driving environment type or context, and driver identity.

16. Method according to claim 15, wherein at least one of the criteria is evaluated from the output signals of at least one sensor for detecting a driver state and/or a vehicle state and/or an environmental state.

17. Method according to claim 1, wherein instead of a vehicle driver the at least one of communication and interaction is conducted between a human being and a plurality of signal or information sources which in case of activation have to be considered or handled in dependency of at least one certain state and/or other such activated signal or information sources.

18. Method according to claim 1 for being conducted in a system for performing the method, the system comprising an interaction manager, an estimator/predictor for estimating and/or predicting a driver/vehicle environment (DVE) state and a plurality of at least one of integrated and non-integrated applications, and one central or main unit and at least one local or subordinate unit which are connected to each other in a star network or a gateway architecture, wherein within and/or between the local units a resource management is conducted and between the central unit and at least one local unit an information and resource management is conducted.

19. Method for at least one of communication and interaction between a vehicle driver and a plurality of at least one of integrated and non-integrated applications, by a routine executed by an interaction manager, comprising the following steps:

determining at least one of a current and a predicted driver/vehicle environment (DVE) state; and controlling the configuration of a human machine interface (HMI) and/or a service state and/or a mode of operation or function (s) of at least one of the applications by the interaction manager in dependence of a driver/vehicle environment (DVE) state; and conducting the at least one of the communication and interaction with the driver solely by the application.

20. Method according to claim 19, wherein controlling the configuration is conducted by sending a message to the application by the interaction manager, wherein the message contains a driving situation index which is evaluated on the basis of a current and/or predicted driver/vehicle environment (DVE) state, and wherein the application receiving the message is provided for controlling its human machine interface (HMI) and/or its service state and/or its mode of operation or function(s) according to the driving situation index contained within the received message.

21. Method according to claim 19, wherein at least one of a current and a predicted environment (DVE) state is evaluated on the basis of at least one of the following criteria: primary task demand, secondary task demand, visual distraction, physiological driver impairment, driver characteristics, specific driving situations, overall driving environment type or context, and driver identity.

22. Method according to claim 21, wherein at least one of the criteria is evaluated from the output signals of at least one sensor for detecting a driver state and/or a vehicle state and/or an environmental state.

23. Method according to claim 19 for being conducted in a system for performing the method, the system comprising an interaction manager, an estimator/predictor for estimating and/or predicting a driver/vehicle environment (DVE) state and a plurality of at least one of integrated and non-integrated applications, and one central or main unit and at least one local or subordinate unit which are connected to each other in a star network or a gateway architecture, wherein within and/or between the local units a resource management is conducted and between the central unit and at least one local unit an information and resource management is conducted.

24. System for conducting a method according to claim 1, comprising an interaction manager, an estimator/predictor for estimating and/or predicting a driver/vehicle environment (DVE) state and a plurality of at least one of integrated and non-integrated applications.

25. System according to claim 24, comprising a sensor array with a plurality of sensors which are connected with the estimator/predictor for estimating and/or predicting the driver/vehicle environment (DVE) state.

26. System according to claim 24, wherein at least one non-integrated application is equipped with a human machine interface.

27. System according to claim 24, comprising an integrated human machine interface.

28. System according to claim 24, comprising a driver information unit including at least one of the following components: the interaction manager, the estimator/predictor for estimating and/or predicting the environment (DVE) state, and the integrated human machine interface.

29. System according to claim 24, wherein one of the applications is a text converter which is provided for storing chunked text segments in a second waiting queue and for outputting the text segments as speech and/or for displaying them on a display, respectively.

30. System according to claim 29, wherein the text converter comprises a parser for slicing text into chunked text segments and for storing the same in the second waiting queue.

31. System according to claim 29, wherein the text converter comprises a speech generator and/or a display which are provided for executing the routine, before generating and outputting a chunked text segment as speech and/or displaying it on the display, respectively.

32. System according to claim 24, comprising a microcomputer for conducting a method for at least one of communication and interaction between a vehicle driver and a plurality of at least one integrated and non-integrated applications, by a routine executed by an interaction manager and by each application before at least one of communicating and interacting with the driver, wherein the routine comprises the following steps:

sending a request by an application of the plurality of applications to the interaction manager for permission to at least one communicate and interact with the driver;

determining by the interaction manager whether a permission for the requested at least one of communication and interaction can be given, in dependence of at least one of a current and predicted driver/vehicle environment (DVE) state and of other requests which have been received before from at least one of this and/or other applications;

generating and transmitting a response by the interaction manager to the application, comprising an indication about permitting or not permitting the requested at least one of communication and interaction;

if the indication permits the requested at least one of communication and interaction, conducting the requested at least one of communication and interaction with the drive solely by the application; and if the indication does not permit the requested at least one of communication and interaction, not conducting the requested at least one of communication and interaction and awaiting permission from the interaction manager by the application to at least one of communicate and interact with the driver.

33. System according to claim 24, comprising one central or main unit and at least one local or subordinate unit which are connected to each other in a star network or a gateway architecture.

34. System according to claim 33, wherein the central unit comprises an interaction manager or a driver vehicle environment manager which controls a main information and resource manager for providing information and resource for the system and wherein the at least one local unit comprises a local resource manager which is provided for local resource management.

35. Central or main unit for, or being a part of, a system for conducting a method according to claim 1, the system comprising an interaction manager, an estimator/predictor for estimating and/or predicting a driver/vehicle environment (DVE) state and a plurality of at least one of integrated and non-integrated applications, and one central or main unit and at least one local or subordinate unit which are connected to each other in a star network or a gateway architecture, wherein the central or main unit comprises an interaction manager or driver vehicle environment manager and a main information and resource manager for providing information management and resource management for the system.

36. Local or subordinate unit for, or being a part of, a system for conducting a method according to claim 1, the system comprising an interaction manager, an estimator/predictor for estimating and/or predicting a driver/vehicle environment (DVE) state and a plurality of at least one of integrated and non-integrated applications, and one central or main unit and at least one local or subordinate unit which are connected to each other in a star network or a gateway architecture, wherein the local or subordinate unit comprises a local resource manager which is provided for local resource management.

37. Driver information unit for, or being a part of, a system for conducting a method according to claim 1, the system comprising an interaction manager, an estimator/predictor for estimating and/or predicting a driver/vehicle environment (DVE) state and a plurality of at least one of integrated and non-integrated applications, the driver information unit comprising at least one of the following components: an interaction manager, an estimator/predictor for estimating and/or predicting the driver/vehicle environment (DVE) state and an integrated human machine interface.

38. Interaction manager for, or being a part of, a system for conducting a method according to claim 1, the system comprising an interaction manager, an estimator/predictor for estimating and/or predicting a driver/vehicle environment (DVE) state and a plurality of at least one of integrated and non-integrated applications.

39. Method for at least one of communication and interaction between a vehicle driver and a plurality of at least one of integrated and non-integrated applications, wherein, before an application at least one of communicates and interacts with the driver, a routine is executed by an interaction manager, comprising the following steps:
   receiving a request from an application of the plurality of applications for permission to at least one of communicate and interact with the driver;
   determining whether a permission for the requested at least one of communication and interaction with the driver can be given, in dependence of a current and/or predicted driver/vehicle environment (DVE) state and/or of other requests which have been received before from this and/or other applications;
   generating and transmitting a response to the application, comprising an indication about permitting or not permitting the requested at least one of communication and interaction with the driver;
   conducting the requested at least one of communication and interaction with the driver solely by the application if the response comprises an indication which permits the same; and
   not conducting the requested at least one of communication and interaction if the response does not comprise an indication which permits the same, and awaiting permission from the interaction manager by the application to at least one of communicate and interact with the driver.

40. A driver/vehicle environment (DVE) state estimator/predictor for, or being a part of, a system for conducting a method according to claim 1, the system comprising an interaction manager, an estimator/predictor for estimating and/or predicting a driver/vehicle environment (DVE) state and a plurality of at least one of integrated and non-integrated applications, which driver/vehicle environment (DVE) state estimator is provided for estimating and/or predicting a driver/vehicle environment state.

41. Application for, or being a part of, a system for conducting a method according to claim 1, the system comprising an interaction manager, an estimator/predictor for estimating and/or predicting a driver/vehicle environment (DVE) state and a plurality of at least one of integrated and non-integrated application, which application is provided for executing the routine.

42. Method for at least one of communication and interaction between a vehicle driver and a plurality of at least one of integrated and non-integrated applications, by an interaction manager and a routine executed by at least one of the applications, comprising the following steps:
   sending a request by an application of the plurality of applications to the interaction manager for permission to at least one of communicate and to interact with the driver;
   receiving a response from the interaction manager;
   conducting the requested at least one of communication and interaction with the driver solely by the application if the response comprises an indication which permits the same; and
   not conducting the requested at least one of communication and interaction if the response does not comprise an indication which permits the same, and awaiting permission from the interaction manager by the application to at least one of communicate and interact with the driver.

43. Adapter for, or being a part of, an application for, or being a part of, a system for conducting a method according to claim 1, the system comprising an interaction manager, an estimator/predictor for estimating and/or predicting a driver/vehicle environment (DVE) state and a plurality of at least one of integrated and non-integrated applications, the adapter being provided for connecting the application with the system and for providing the application with capability to execute the routine.

44. Computer program comprising computer program code means adapted to perform a method according to claim 1 when said program is run on a programmable microcomputer.

45. Computer program according to claim 44 adapted to be downloaded to a system for conducting a method for at least one of communication and interaction between a vehicle driver and a plurality of at least one of integrated and non-integrated applications, by a routine executed by an interaction manager and by each application before at least one of communicating and interacting with the driver, wherein the routine comprises the following steps:
   sending a request by an application of the plurality of applications to the interaction manager for permission to at least one of communicate and interact with the driver;
   determining by the interaction manager whether a permission for the requested at least one of communication and interaction can be given, in dependence of at least one of a current and predicted driver/vehicle environment (DVE) state and of other requests which have been received before from at least one of this and/or other applications;
   generating and transmitting a response by the interaction manager to the application, comprising an indication about permitting or not permitting the requested at least one of communication and interaction;
   if the indication permits the requested at least one of communication and interaction, conducting the requested at least one of communication and interaction with the driver solely by the application; and
   if the indication does not permit the requested at least one of communication and interaction, not conducting the requested at least one of communication and interaction and awaiting permission from the interaction manager by the application to at least one of communicate and interact with the driver,
   the system comprising an interaction manager, an estimator/predicator for estimating and/or predicting a driver/vehicle environment (DVE) state and a plurality of at least one of integrated and non-integrated application or one of its components, when run on a computer which is connected to internet.

46. Computer program product stored on a computer usable medium, comprising computer program code means according to claim 44.

47. System for conducting a method according to claim 19, comprising an interaction manager, an estimator/predictor for estimating and/or predicting a driver/vehicle environment (DVE) state and a plurality of at least one of integrated and non-integrated applications.

48. System according to claim 47, comprising a sensor array with a plurality of sensors which are connected with the estimator/predictor for estimating and/or predicting the driver/vehicle environment (DVE) state.

49. System according to claim 47, wherein at least one of the non-integrated applications is equipped with a human machine interface.

50. System according to claim 47, comprising an integrated human machine interface.

51. System according to claim 47, comprising a driver information unit including at least one of the following components: the interaction manager, the estimator/predictor for estimating predicting the environment (DVE) state, and the integrated human machine interface.

52. System according to claim 47, wherein one of the applications is a text converter which is provided for storing chunked text segments in a second waiting queue and for outputting the text segments as speech and/or for displaying them on a display, respectively.

53. System according to claim 52, wherein the text converter comprises a parser for slicing text into chunked text segments and for storing the same in the second waiting queue.

54. System according to claim 52, wherein the text converter comprises a speech generator and/or a display which are provided for executing the routine before generating and outputting a chunked text segment as speech and/or displaying it on the display, respectively.

55. System according to claim 47, comprising a microcomputer for conducting a method for at least one of communication and interaction between a vehicle driver and a plurality of at least one of integrated and non-integrated applications, by a routine executed by an interaction manager, comprising the following steps:
   determining at least one of a current and a predicted driver/vehicle environment (DVE) state; and
   controlling the configuration of a human machine interface (HMI) and/or a service state and/or a mode of operation or function (s) of at least one of the applications by the interaction manager in dependence of a driver/vehicle environment (DVE) state; and
   conducting the at least one of the communication and interaction with the driver solely by the application.

56. System according to claim 47, comprising one central or main unit and at least one local or subordinate unit which are connected to each other in a star network or a gateway architecture.

57. System according to claim 56, wherein the central unit comprises an interaction manager or a driver vehicle environment manager which controls a main information and resource manager for providing information and resource for the system and wherein the at least one local unit comprises a local resource manager which is provided for local resource management.

58. Central or main unit for, or being a part of, a system for conducting a method according to claim 19, the system comprising an interaction manager, an estimator/predictor for estimating and/or predicting a driver/vehicle environment (DVE) state and a plurality of at least one of integrated and non-integrated applications, and one central or main unit and at least one local or subordinate unit which are connected to each other in a star network or a gateway architecture, wherein the central or main unit comprises an interaction manager or driver vehicle environment manager and a main information and resource manager for providing information management and resource management for the system.

59. Local or subordinate unit for, or being a part of, a system for conducting a method according to claim 19, the system comprising an interaction manager, an estimator/predictor for estimating and/or predicting a driver/vehicle environment (DVE) state and a plurality of at least one of integrated and non-integrated applications, and one central or main unit and at least one local or subordinate unit which are connected to each other in a star network or a gateway architecture, comprising a local resource manager which is provided for local resource management.

60. Driver information unit for, or being a part of, a system for conducting a method according to claim 19, the system comprising an interaction manager, an estimator/predictor for estimating and/or predicting a driver/vehicle environment (DVE) state and a plurality of at least one of integrated and non-integrated applications, the driver information unit comprising at least one of the following components: an interaction manager, an estimator/predictor for estimating and/or predicting the driver/vehicle environment (DVE) state and an integrated human machine interface.

61. Interaction manager for, or being a part of, a system for conducting a method according to claim 19, the system comprising an interaction manager, an estimator/predictor for estimating and/or predicting a driver/vehicle environment (DVE) state and a plurality of at least one of integrated and non-integrated applications.

62. A driver/vehicle environment (DVE) state estimator/predictor for, or being a part of, a system for conducting a method according to claim 19, the system comprising an interaction manager, an estimator/predictor for estimating and/or predicting a driver/vehicle environment (DVE) state and a plurality of at least one of integrated and non-integrated applications, which driver/vehicle environment (DVE) state estimator/predictor is provided for estimating and/or predicting a driver/vehicle environment state.

63. Application for, or being a part of, a system for conducting a method according to claim 19, the system comprising an interaction manager, an estimator/predictor for estimating and/or predicting a driver/vehicle environment (DVE) state and a plurality of at least one of integrated and non-integrated application which application is provided for executing the routine.

64. Adapter for, or being a part of, an application for, or being a part of, a system for conducting a method according to claim 19, the system comprising an interaction manager, an estimator/predictor for estimating and/or predicting a driver/vehicle environment (DVE) state and a plurality of at least one of integrated and non-integrated applications, the adapter being provided for connecting the application with the system and providing the application with capability to execute the routine.

65. Computer program comprising computer program code means adapted to perform a method according to claim 19 when said program is run on a programmable microcomputer.

66. Computer program according to claim 65 adapted to be downloaded to a system for conducting a method for at least one of communication and interaction between a vehicle driver and a plurality of at least one of integrated and non-integrated applications, by a routine executed by an interaction manager, comprising the following steps:
   determining at least one of a current and predicted driver/vehicle environment (DVE) state; and controlling the configuration of a human machine interface (HMI) and/or a service state and/or a mode of operation of function (s) of at least one of the application by the interaction manager in dependence of a driver/vehicle environment (DVE) state; and conducting the at least one of the communication and interaction with the driver solely by the application, the system comprising an interaction manger, and estimator/predictor for estimating and/or predicting a driver/vehicle environment (DVE) state and a plurality of at least one of integrated and non-integrated applications, or one of its components, when run on a computer which is connected to internet.

67. Computer program product stored on a computer usable medium, comprising computer program code means according to claim 65.

* * * * *